(12) United States Patent
Huang et al.

(10) Patent No.: US 12,485,800 B2
(45) Date of Patent: Dec. 2, 2025

(54) TRACTION BATTERY HEATING CIRCUIT, SYSTEM, AND CONTROL METHOD, AND ELECTRIC DEVICE

(71) Applicant: CONTEMPORARY AMPEREX TECHNOLOGY (HONG KONG) LIMITED, Hong Kong (CN)

(72) Inventors: Xiaojian Huang, Ningde (CN); Zhimin Dan, Ningde (CN); Jinfeng Gao, Ningde (CN); Jin Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 335 days.

(21) Appl. No.: 18/303,584

(22) Filed: Apr. 20, 2023

(65) Prior Publication Data

US 2023/0256867 A1  Aug. 17, 2023

Related U.S. Application Data

(63) Continuation of application No. PCT/CN2022/085823, filed on Apr. 8, 2022.

(30) Foreign Application Priority Data

Aug. 5, 2021  (WO) ................ PCT/CN2021/110708

(51) Int. Cl.
*B60L 58/27* (2019.01)
*B60L 1/02* (2006.01)
(Continued)

(52) U.S. Cl.
CPC ................ *B60L 58/27* (2019.02); *B60L 1/02* (2013.01); *B60L 50/51* (2019.02); *B60L 53/22* (2019.02);
(Continued)

(58) Field of Classification Search
CPC .......... B60L 58/27; B60L 58/12; B60L 58/25; B60L 58/10; B60L 58/24; B60L 58/14;
(Continued)

(56) References Cited

U.S. PATENT DOCUMENTS

2012/0200164 A1  8/2012  Nakatsu et al.
2012/0280658 A1  11/2012  Xu et al.
(Continued)

FOREIGN PATENT DOCUMENTS

CN  202423513 U  9/2012
CN  103419614 A  12/2013
(Continued)

OTHER PUBLICATIONS

CN 110970690 B Translation (Year: 2021).*
(Continued)

*Primary Examiner* — Russell Frejd
(74) *Attorney, Agent, or Firm* — K&L Gates LLP (57) ABSTRACT

A traction battery heating circuit, system, and control method, and an electric device are provided. In some embodiments, the traction battery heating circuit includes: a power supply module, including at least one battery group; an inverter module, connected to the power supply module and including an M-phase leg circuit, where the leg circuit is connected in parallel to the battery group, and M is an even multiple of three; a driving module, including a motor having M windings, where the M windings are respectively connected to M phase legs of the leg circuit in one-to-one correspondence; and a control module, connected to the leg circuit, configured to control upper legs of at least three phase legs in the leg circuit and lower legs of the same number of phase legs in remaining legs to be turned on.

18 Claims, 4 Drawing Sheets

(51) Int. Cl.
  *B60L 50/51* (2019.01)
  *B60L 53/22* (2019.01)
  *B60L 58/12* (2019.01)
  *B60L 58/25* (2019.01)
  *H01M 10/615* (2014.01)
  *H01M 10/625* (2014.01)
  *H01M 10/63* (2014.01)
  *H02M 7/537* (2006.01)

(52) U.S. Cl.
  CPC ............... *B60L 58/12* (2019.02); *B60L 58/25* (2019.02); *H01M 10/615* (2015.04); *H01M 10/625* (2015.04); *H01M 10/63* (2015.04); *H02M 7/537* (2013.01); *B60L 2210/40* (2013.01); *B60L 2240/545* (2013.01); *H01M 2220/20* (2013.01)

(58) Field of Classification Search
  CPC .. B60L 1/01; B60L 50/51; B60L 53/22; B60L 2210/40; B60L 2210/46; B60L 2240/545; B60L 2240/54; B60L 2240/421; B60L 2220/58; B60L 2270/145; H01M 10/615; H01M 10/625; H01M 10/63; H01M 2220/20; H02M 7/537; H02M 7/5387; H02P 29/62; H02P 21/05; H02P 27/06; Y02T 10/70
  See application file for complete search history.

(56) References Cited

U.S. PATENT DOCUMENTS

| | | | |
|---|---|---|---|
| 2013/0003299 A1 | 1/2013 | Wissner et al. | |
| 2017/0098874 A1* | 4/2017 | Shen | B60H 1/00278 |
| 2020/0395883 A1 | 12/2020 | Iwamoto et al. | |
| 2022/0223937 A1* | 7/2022 | Xu | B60L 50/60 |

FOREIGN PATENT DOCUMENTS

| | | | | |
|---|---|---|---|---|
| CN | 103560304 A | 2/2014 | | |
| CN | 108111022 A | 6/2018 | | |
| CN | 105577071 B | 9/2018 | | |
| CN | 105529977 B | 1/2019 | | |
| CN | 109927572 A | 6/2019 | | |
| CN | 110957957 A | 4/2020 | | |
| CN | 110962631 A | 4/2020 | | |
| CN | 111347937 A | 6/2020 | | |
| CN | 111404245 B | 7/2020 | | |
| CN | 211209619 U | 8/2020 | | |
| CN | 110224651 B | 10/2020 | | |
| CN | 110970690 B * | 1/2021 | ......... | H01M 10/615 |
| CN | 112224056 A | 1/2021 | | |
| CN | 112550077 A | 3/2021 | | |
| CN | 112550079 A | 3/2021 | | |
| CN | 112706657 A * | 4/2021 | ......... | H01M 10/615 |
| CN | 112810467 A | 5/2021 | | |
| CN | 113036264 A | 6/2021 | | |
| CN | 113085516 A | 7/2021 | | |
| DE | 102018202447 A1 | 8/2019 | | |
| JP | 2003164009 A | 6/2003 | | |
| JP | 2008167547 A | 7/2008 | | |
| JP | 2009095169 A | 4/2009 | | |
| JP | 2012228115 A | 11/2012 | | |
| JP | 2014072955 A | 4/2014 | | |
| JP | 2020110042 A | 7/2020 | | |
| KR | 1020200139201 A | 12/2020 | | |
| KR | 1020200140919 A | 12/2020 | | |
| KR | 1020210089213 A | 7/2021 | | |
| WO | 2020079983 A1 | 4/2020 | | |
| WO | 2021057339 A1 | 4/2021 | | |
| WO | 2021057340 A1 | 4/2021 | | |

OTHER PUBLICATIONS

CN 112706657 A Translation (Year: 2021).*
The extended European search report received in the corresponding European Application 22851602.7, mailed Mar. 25, 2024.
Notice of Allowance received in the corresponding U.S. Appl. No. 17/563,207, mailed Mar. 20, 2024.
Notice of Allowance received in the corresponding Korean Application 10-2021-7040606, mailed on Jul. 3, 2024.
International Search Report received in the corresponding International Application PCT/CN2021/110708, mailed Apr. 14, 2022.
International Search Report received in the corresponding International Application PCT/CN2022/085823, mailed Jun. 22, 2022.
The extended European Search Report received in the corresponding European Application 21815871.5, mailed Sep. 12, 2022.
Notice of Reasons for Refusal received in the corresponding Japanese Application 2023-524153, mailed Jun. 10, 2024.
The Office Action received in the corresponding European Application 21815871.5, mailed Sep. 18, 2023.
Notice of Reasons for Refusal received in the corresponding Japanese Application 2021-574312, mailed Oct. 16, 2023.
Request for the Submission of an Opinion received in the corresponding Korean Application 10-2021-7040606, mailed May 12, 2023.
Notice of Grant (with English Machine Translation), mailed Jun. 30, 2025, for corresponding Chinese Patent Application No. 202280004711.9.
Ruan Haijun, "Research on Optimization of Heating and Charging Methods for Lithium-ion Batteries in Low Temperature Environments", China Doctoral Dissertation Full-text Database (Engineering Technology Series II), vol. 2021, Issue 04, Apr. 15, 2021.

* cited by examiner

TRACTION BATTERY HEATING CIRCUIT, SYSTEM, AND CONTROL METHOD, AND ELECTRIC DEVICE

CROSS-REFERENCE TO RELATED APPLICATIONS

The present application is a continuation of International Application PCT/CN2022/085823, filed Apr. 8, 2022 and entitled "TRACTION BATTERY HEATING CIRCUIT, SYSTEM, AND CONTROL METHOD, AND ELECTRIC DEVICE", the entire contents of which are incorporated herein by reference.

TECHNICAL FIELD

This application relates to the technical field of batteries, and in particular, to a traction battery heating circuit, system, and control method, and an electric device.

BACKGROUND

Due to the advantages of high energy density, rechargeability, safety, and environmental friendliness, traction batteries are widely used in new energy vehicles, consumer electronics, energy storage systems, and other fields.

However, in a low temperature environment, use of traction batteries is limited. Specifically, in a low temperature environment, discharge capacity of traction batteries severely decays, and the batteries cannot be charged. In particular, six-phase motors (or motors with more phases) require more power from the traction battery. Therefore, when the charge and discharge capability of the traction battery is limited, vehicles with six-phase motors give poor user experience. Therefore, for normal use of traction batteries, traction batteries need to be heated in a low temperature environment.

SUMMARY

Embodiments of this application provide a traction battery heating circuit, system, and control method, and an electric device, so as to achieve rapid heating of batteries of power supply modules for original multi-phase motors.

According to a first aspect, this application provides a traction battery heating circuit, including: a power supply module, including at least one battery group; an inverter module, connected to the power supply module and including an M-phase leg circuit, where the leg circuit is connected in parallel to the battery group, and M is an even multiple of three; a driving module, including a motor having M windings, where the M windings are respectively connected to M phase legs of the leg circuit in one-to-one correspondence; and a control module, connected to the leg circuit, configured to control upper legs of at least three phase legs in the leg circuit and lower legs of the same number of phase legs in remaining legs to be turned on, so that the power supply module, the inverter module, and the driving module form a charge loop and a discharge loop that are alternately switched.

In the technical solution of this embodiment of this application, the control module connected to the inverter module is provided so that the power supply module, the inverter module, and the driving module can form the charge loop or the discharge loop by controlling each phase leg in the leg circuit to be turned on or turned off. When the charge loop or the discharge loop works, current flows through the battery group of the power supply module. The battery group has an internal resistance, consuming part of the current to convert electric energy into thermal energy that heats the battery group of the power supply module. In addition, to effectively heat the battery group, especially battery groups of six-phase motor driving systems, in this embodiment, the control module controls the upper legs of the at least three phase legs in the leg circuit and the lower legs of the same number of phase legs in the remaining legs to be turned on, so that the power supply module, the inverter module, and the driving module form the charge loop and the discharge loop that are alternately switched, so as to charge and discharge the battery group. In this way, the charge and discharge loops for cycling charge and discharge can be formed, and the battery group can be continuously heated until the battery group reaches a normal operating temperature, so that the traction battery can be used normally in a low temperature environment, avoiding that the charge and discharge capability of the traction battery is limited, and significantly improving experience of customers in driving vehicles in winter.

In some embodiments, the motor includes a six-phase symmetric motor. Because currents flowing into or out of three phase windings in the six-phase symmetric motor are always equal in magnitude and directions of the currents are symmetrical to each other, a resultant current can be small, thereby forming a small resultant magnetic field, and avoiding loud noise during operation of the heating circuit.

In some embodiments, in the charge loop or the discharge loop, a spatial phase difference among three windings respectively connected to the three phase upper legs turned on is 120°, and a spatial phase difference among three windings respectively connected to the three lower legs turned on is 120°. In the charge loop or the discharge loop, in a case that the spatial phase difference among the three windings connected to the three phase upper (lower) legs turned on is 120°, a spatial phase difference of currents flowing into (out of) the three phase windings is 120°, so that a stator magnetic field formed by the spatially symmetric three phase windings is close to zero (about 0-0.5 T), thereby effectively suppressing vibration noise caused by interaction of the stator magnetic field with a rotor magnetic field when a traction battery is heated by the traction battery heating circuit. In addition, a resultant magnetic field of currents flowing into a plurality of windings of the same motor is controlled to be 0-0.5T, so that the motor does not operate, and the problem of a rotor of the motor being overheated can be solved, thereby prolonging a time for self-heating of the battery.

According to a second aspect, this application provides a traction battery heating control method, applied to the traction battery heating circuit according to the first aspect. The method includes: sending an enabling signal to control upper legs of at least three phase legs in a leg circuit and lower legs of the same number of phase legs in remaining legs to be turned on, so that a power supply module, an inverter module, and a driving module of a battery heating circuit form a charge loop and a discharge loop that are alternately switched.

In the technical solution of this embodiment of this application, the control module controls the upper legs of the at least three phase legs in the leg circuit and the lower legs of the same number of phase legs in the remaining legs to be turned on, so that the power supply module, the inverter module, and the driving module form the charge loop and the discharge loop that are alternately switched, so as to charge and discharge the battery group. In this way, the charge and discharge loops for cycling charge and discharge can be formed, and the battery group can be continuously heated until the battery group reaches a normal operating temperature, so that the traction battery can be used normally in a low temperature environment, avoiding that the charge and discharge capability of the traction battery is limited, and significantly improving experience of customers in driving vehicles in winter.

In some embodiments, the method includes: sending heating signals to the inverter module at a preset frequency to control the inverter module to alternately switch the charge loop and the discharge loop. This avoids that a battery is depleted when the battery is discharged for a long time, or that a rotor of the motor rotates or a stator of the motor is overheated when the motor does work for a long time.

In some embodiments, the sending heating signals to the inverter module at a preset frequency includes: alternately sending a first heating signal and a second heating signal to the inverter module at the preset frequency, where the first heating signal turns on the upper legs of the at least three phase legs in the leg circuit and the lower legs of the same number of phase legs in the remaining legs, so that the power supply module, the inverter module, and the driving module of the battery heating circuit form the charge loop, and the second heating signal turns on the lower legs of the at least three phase legs and upper legs of the same number of phase legs in the remaining legs, so that the power supply module, the inverter module, and the driving module of the battery heating circuit form the discharge loop. This can not only effectively heat the traction battery, but also avoid energy loss and noise caused by long-time charge or discharge.

In some embodiments, a motor of the driving module includes a six-phase symmetric motor; the first heating signal turns on upper legs of three phase legs in the six-phase leg circuit and lower legs of the other three phase legs, so that the power supply module, the inverter module, and the driving module of the battery heating circuit form the charge loop; the second heating signal turns on lower legs of the three phase legs in the six-phase leg circuit and upper legs of the other three phase legs, so that the power supply module, the inverter module, and the driving module of the battery heating circuit form the discharge loop; and in the charge loop or the discharge loop, a spatial phase difference among three windings respectively connected to the three phase upper legs turned on is 120°, and a spatial phase difference among three windings respectively connected to the three lower legs turned on is 120°. A resultant magnetic field of currents flowing into a plurality of windings of the same motor is controlled to be 0-0.5T, so that the motor does not operate, and the problem of a rotor of the motor being overheated can be solved, thereby prolonging a time for self-heating of the battery.

In some embodiments, the sending heating signals to the inverter module at a preset frequency includes: determining whether a state of charge of the battery group is greater than or equal to a preset threshold; and if yes, sending the heating signals to the inverter module at the preset frequency. When the SOC of the traction battery is greater than the preset threshold, current flowing through the loop may be modulated into an alternating current. Heat is generated as a result of internal resistance that the alternating current experiences when passing through the traction battery, thereby heating the traction battery and improving heating efficiency. When the SOC of the battery is less than or equal to the preset threshold, that is, when the battery has insufficient power, a direct current is used to generate heat at windings to heat the traction battery, thereby reducing power consumption and improving flexibility of the traction battery heating system.

In some embodiments, the sending heating signals to the inverter module at a preset frequency includes: obtaining an operating state of the motor; and sending the heating signals to the inverter module at the preset frequency in a case that the operating state of the motor is a non-driving state. The operating state of the motor being determined can avoid that the traction battery is heated when the motor is in the driving state, so that performance of a power apparatus such as a vehicle is not affected.

In some embodiments, the sending heating signals to the inverter module at a preset frequency includes: receiving a control signal sent by a vehicle control unit; and sending the heating signals to the inverter module at the preset frequency in a case that the control signal indicates heating the traction battery. The control signal sent by the vehicle control unit being received can allow quick enabling of a heating mode to heat the traction battery in time.

In some embodiments, the sending heating signals to the inverter module at a preset frequency includes: receiving request data sent by a battery management system; and sending the heating signals to the inverter module at the preset frequency in a case that the request data indicates that the traction battery meets a heating condition. The heating request sent by the BMS is received so that the control module can control the traction battery heating system to heat the traction battery in time, so as to avoid affecting the use of a power apparatus such as a vehicle.

In some embodiments, the method further includes: determining whether temperature of the battery group meets a stop heating condition, where the stop heating condition includes that the battery group reaches a preset temperature or the traction battery experiences abnormal temperature rise; and if yes, sending a stop heating signal to the inverter module, where the stop heating signal enables the inverter module to open the charge loop or the discharge loop. The stop heating signal is set, so that heating can be stopped in time after the battery group experiences abnormal temperature rise or reaches the normal working temperature, so as to avoid waste of resources and facilitate timely use for users.

According to a third aspect, this application provides a traction battery heating system. The system includes a heating control unit and the traction battery heating circuit according to any one of the embodiments of the first aspect, where the heating control unit is configured to send instructions to the traction battery heating circuit to control the traction battery heating circuit to form a charge loop and a discharge loop that are alternately switched.

According to a fourth aspect, this application provides an electric device, including the traction battery heating system according to the third aspect.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

DESCRIPTION OF EMBODIMENTS

The following describes in detail the embodiments of technical solutions of this application with reference to the accompanying drawings. The following embodiments are merely intended for a clearer description of the technical solutions of this application, and therefore are merely used as examples and do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "have", and any other variations thereof in the specification, claims and brief description of drawings of this application are intended to cover non-exclusive inclusions.

In the description of the embodiments of this application, the terms "first", "second", and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various positions in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than to indicate or imply that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in the embodiments of this application as appropriate to specific situations.

With the development of the times, with advantages such as environmental friendliness, low voice, and low costs, new energy vehicles have huge market prospects and can effectively promote energy conservation and emission reduction, and therefore are conducive to the development and progress of the society.

It is noted in this application that due to the electrochemical characteristics of traction batteries, charge and discharge capability of the traction batteries is greatly limited in low temperature environments, which severely affects experience of customers in driving vehicles in winter. In particular, six-phase motors (or motors with more phases) require more power from the traction battery. Therefore, when the charge and discharge capability of the traction battery is limited, vehicles with six-phase motors have poor user experience. Therefore, for normal use of traction batteries, traction batteries need to be heated in low temperature environments.

To improve the charge and discharge capability of traction batteries in a low temperature environment, it has been found through research in this application that traction batteries may be heated by a motor loop in order to avoid unnecessary costs in heating traction batteries. Specifically, a motor generates heat during operation. The heat generated by windings of the motor may be absorbed by a vehicle cooling system, and then the absorbed heat is transmitted to the traction battery to heat the traction battery. However, when the battery is heated by a motor loop, the cooling system itself consumes part of the heat, so that the capability to heat the traction battery is greatly reduced. In addition, the motor is a driving system for battery power. When the charge and discharge capability of the traction battery is greatly limited, the capability of the traction battery to power the motor is also reduced, heat generated by windings of the motor is also greatly reduced, and the effect of heating the traction battery is also greatly weakened to an extent that the traction battery cannot be effectively heated.

Out of the consideration of the foregoing reasons, to resolve the problem that the charge and discharge capability of traction batteries is greatly limited in a low temperature environment to an extent that experience of customers in driving vehicles in winter is severely affected, this application has designed a traction battery heating circuit through deep research. A control module is provided and configured to connect to a leg circuit of an inverter module, so as to control upper legs of at least three phase legs in the leg circuit and lower legs of the same number of phase legs in remaining legs to be all turned on, so that a power supply module, the inverter module, and a driving module form a charge loop and a discharge loop that are alternately switched.

During application of such traction battery heating circuit, the control module connected to the inverter module is provided so that the power supply module, the inverter module, and the driving module can form the charge loop or the discharge loop by controlling each phase leg in the leg circuit to be turned on or turned off. When the charge loop or the discharge loop works, a current flows through the battery group of the power supply module. The battery group has an internal resistance, consuming part of the current to convert electric energy into thermal energy that heats the battery group of the power supply module.

To effectively heat the battery group, especially battery groups of six-phase motor driving systems, in this embodiment, the control module controls the upper legs of the at least three phase legs in the leg circuit and the lower legs of the same number of phase legs in the remaining legs to be turned on, so that the power supply module, the inverter module, and the driving module form the charge loop and the discharge loop that are alternately switched, so as to charge and discharge the battery group. In this way, the charge and discharge loops for cycling charge and discharge can be formed, and the battery group can be continuously heated until the battery group reaches a normal operating temperature, so that the traction battery can be used normally in a low temperature environment, avoiding that the charge and discharge capability of the traction battery is limited, and significantly improving experience of customers in driving vehicles in winter.

The traction battery in the embodiments of this application may be but is not limited to a lithium-ion battery, a lithium metal battery, a lead-acid battery, a nickel-cadmium battery, a nickel-metal hydride battery, a lithium-sulfur battery, a lithium-air battery, a sodium-ion battery, or the like. This is not limited herein. In terms of scale, the battery in this embodiment of this application may be a battery cell, or may be a battery module or a battery pack. This is not limited herein. In terms of application scenarios, the battery can be used in but is not limited to power apparatuses such as a vehicle or a ship. For example, the battery can be used in a power vehicle to power a motor of the power vehicle as a power source for an electric vehicle. The battery can also power other electric components in the electric vehicle, such as powering an in-car air conditioner, an in-car player, or the like.

For ease of description, the electric device being a new energy vehicle (power vehicle) in an embodiment of this application is used as an example for description in the following embodiments.

Driving systems are one of core components of new energy vehicles, and the driving characteristics of the driving systems determine main driving performance indexes of vehicles. A motor driving system of a new energy vehicle mainly includes an engine (namely, motor), a motor control unit, various detection sensors, a power supply module, and the like. The motor is a rotating electromagnetic machine which runs on the principle of electromagnetic induction, and is configured to convert electric energy into mechanical energy. In operation, the motor absorbs electric power from a power supply module, and outputs mechanical power to a mechanical system.

A battery group of the power supply module can be heated by the traction battery heating circuit provided in the embodiments of this application, so that the traction battery can be normally used in a low temperature environment.

Figure 1:
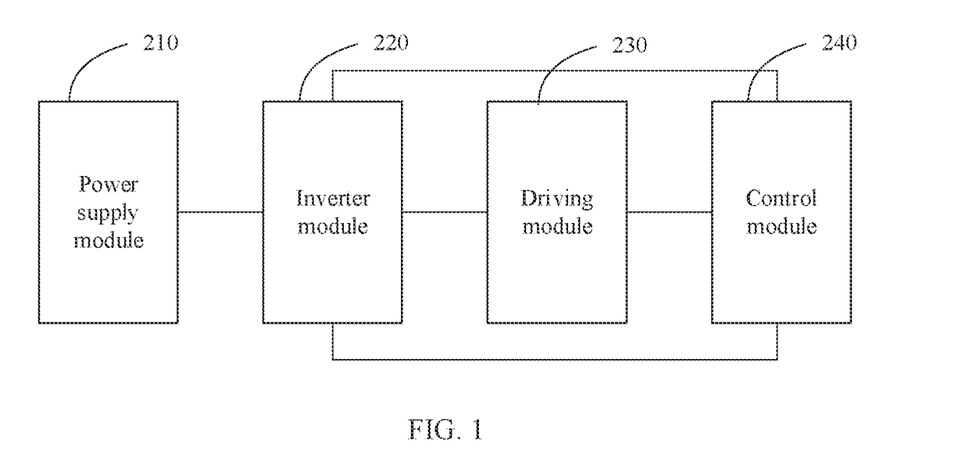
FIG. 1 is a schematic block diagram of a traction battery heating circuit according to an embodiment of this application.
Figure 2:
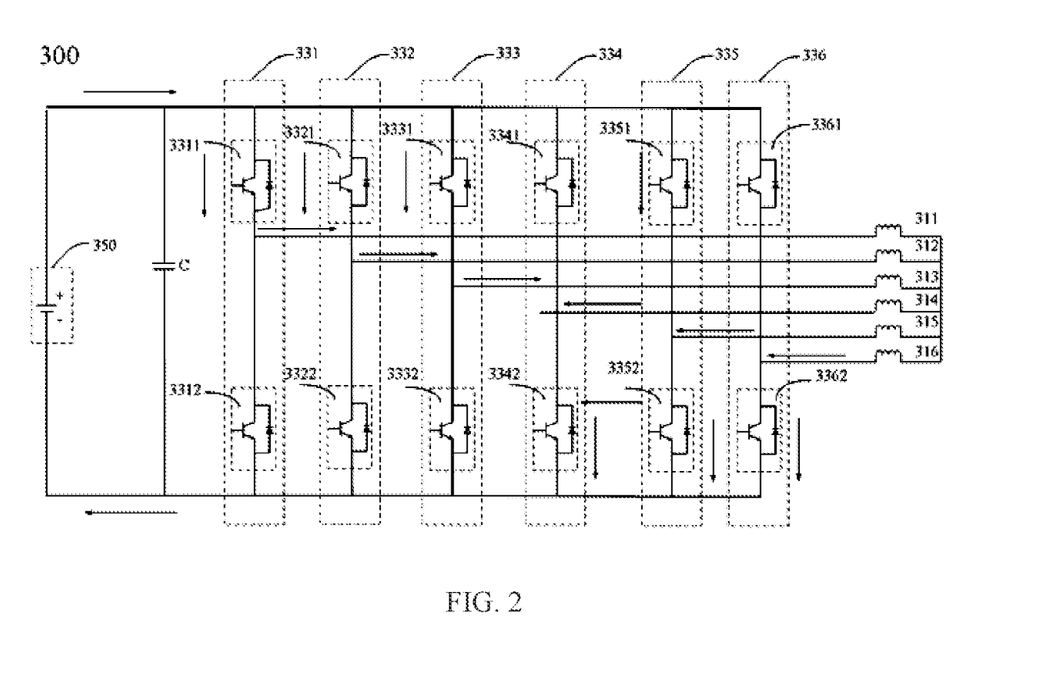
FIG. 2 is a circuit diagram (discharge loop) of a traction battery heating circuit according to an embodiment of this application.
Figure 3:
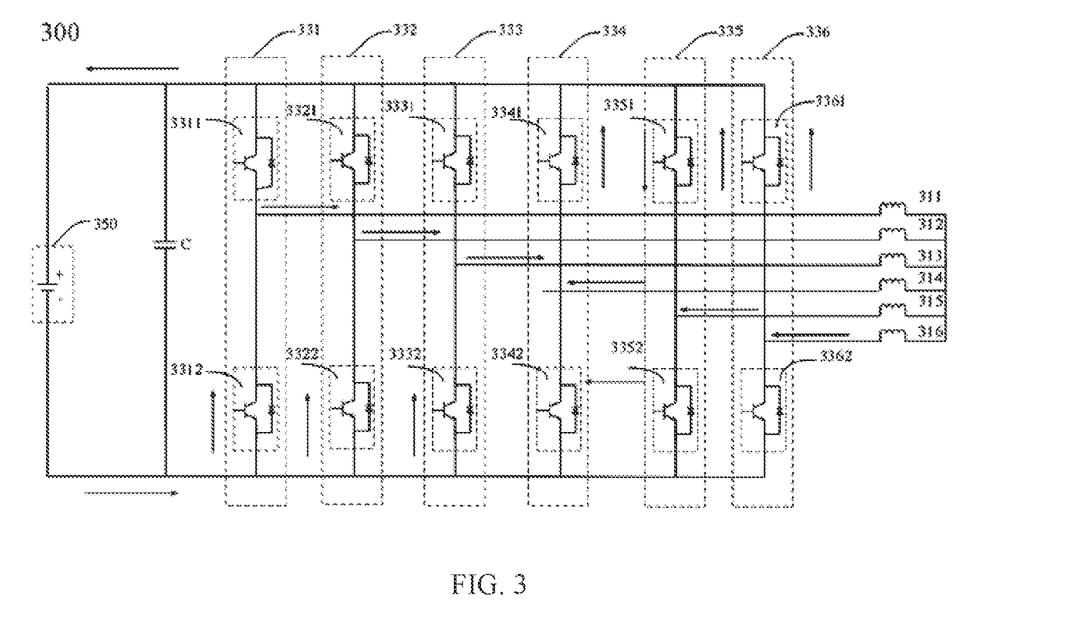
FIG. 3 is a circuit diagram (charge loop) of a traction battery heating circuit according to an embodiment of this application.

In some embodiments of this application, refer to FIG. 1, FIG. 2, and FIG. 3. FIG. 1 is a schematic block diagram of a traction battery heating circuit according to some embodiments of this application. FIG. 2 is a schematic structural diagram of a formed discharge loop of a traction battery heating circuit according to some embodiments of this application. FIG. 3 is a schematic structural diagram of a formed charge loop of a traction battery heating circuit according to some embodiments of this application. This application provides a traction battery heating circuit. The circuit includes a power supply module 210, an inverter module 220, a driving module 230, and a control module 240. The power supply module 210 includes at least one battery group. The inverter module 220 is connected to the power supply module 210 and includes an M-phase leg circuit, where the leg circuit is connected in parallel to the battery group, and M is an even multiple of three. The driving module 230 includes a motor having M windings, where the M windings are respectively connected to M phase legs of the leg circuit in one-to-one correspondence. The control module 240 is connected to the leg circuit, configured to control upper legs of at least three phase legs in the leg circuit and lower legs of the same number of phase legs in remaining legs to be turned on, so that the power supply module 210, the inverter module 220, and the driving module 230 form a charge loop and a discharge loop that are alternately switched, so as to charge and discharge the battery group.

The power supply module 210 is implemented by a traction battery and includes at least one battery group. The battery group may be a set of a plurality of battery modules, or may be a battery module including a plurality of battery cells.

The inverter module 220 may be implemented by various types of switches. For example, the inverter module 220 may be implemented by an inverter in a motor driving system. The inverter may be implemented by a leg circuit of an insulated gate bipolar transistor (Insulated Gate Bipolar Transistor, IGBT). Specifically, the number of legs of the leg circuit is the same as the number of windings in the driving module 230, and at least six phases are included. For example, the driving module 230 includes a six-phase motor, and the leg circuit includes six phase legs, which may include a phase A leg, a phase B leg, a phase C leg, a phase D leg, a phase E leg, and a phase F leg, or may include two U phase legs, two V phase legs, and two W phase legs. Each phase leg has an upper leg and a lower leg, and both the upper leg and the lower leg are provided with a switching unit.

The driving module 230 may specifically include M phase windings connected to the legs. A plurality of windings are connected to a common cable and have a common joint. One end of each winding away from the common joint is connected to a joint of an upper leg and a lower leg of one phase leg.

The control module 240 sends a heating signal (namely, an enabling signal) to the inverter module 220. The heating signal can control switching units of an upper leg and a lower leg to control on/off of the upper leg or the lower leg. The control module 240 may be a vehicle control unit (Vehicle control unit, VCU) and/or a motor control unit (Motor control unit, MCU), or may be a control unit provided separately and dedicatedly to control the leg circuit to form charge and discharge loops. This is not specifically limited in this embodiment.

The battery group, M phase legs, and the motor are connected in parallel. Joints of upper and lower legs of the M phase legs are respectively connected to the M phase windings of the M-phase motor in one-to-one correspondence. The control module 240 controls the upper and lower legs of the leg circuit to be turned on or off to alternately switch between the charge loop and the discharge loop, so that a current flows inside the power supply module 210 to generate heat for heating the power supply module 210.

The motor may be specifically a six-phase symmetric motor. As a spatial phase difference of the M windings of the symmetric motor may be a quotient of 360° and M, a spatial phase difference of the six windings of the six-phase symmetric motor is 60°.

The magnetomotive force of a unidirectional winding is a pulse magnetomotive force that is distributed in a stepped manner in space and that changes alternately with a change pattern of current in time. The magnetomotive forces of the six single-phase windings of the six-phase motor are superposed on each other to form a resultant magnetic field of the six phase windings. A larger value of the resultant magnetic field means that the motor has stronger vibration and louder vibration noise.

In a case that a six-phase symmetric motor is used, correspondingly, the leg circuit of the inverter module 220 also includes six phase legs. To form the charge loop or the discharge loop, the control module 240 controls upper legs of any three phase legs of the six phase legs to be turned on, and lower legs of the remaining three phase legs to be turned on, so that current enters from three of the six windings and exits from the other three windings. Because currents flowing into or out of three phase windings in the six-phase symmetric motor are always equal in magnitude and directions of the currents are symmetrical to each other, a resultant current can be small, thereby forming a small resultant magnetic field, and avoiding loud noise during operation of the heating circuit.

It should be noted that the driving module 230 is not limited to a six-phase motor, and may also be a twelve-phase motor or another motor having more than six phases. Correspondingly, the inverter module 220 may include three phase legs or six phase legs. In addition, the numbers of upper and lower legs turned on each time are the same.

Further, when the motor is a six-phase symmetric motor, in the charge loop or the discharge loop, a spatial phase difference among three windings (which may be referred to as first windings) respectively connected to the three phase upper legs turned on is 120°, and a spatial phase difference among three windings (which may be referred to as second windings) respectively connected to the three lower legs turned on is 120°.

In the charge loop or the discharge loop, in a case that the spatial phase difference among the three windings connected to the three phase upper (lower) legs turned on is 120°, a spatial phase difference of currents flowing into (out of) the three phase windings is 120°, so that a stator magnetic field formed by the spatially symmetric three phase windings is close to zero (about 0-0.5 T), thereby effectively suppressing vibration noise caused by interaction of the stator magnetic field with a rotor magnetic field when a traction battery is heated by the traction battery heating circuit. In addition, a resultant magnetic field of currents flowing into a plurality of windings of the same motor is controlled to be 0-0.5T, so that the motor does not operate, and the problem of a rotor of the motor being overheated can be solved, thereby prolonging a time for self-heating of the battery.

A circuit diagram of a traction battery heating circuit according to an embodiment of this application is described in detail with reference to FIG. 2 and FIG. 3.

As shown in FIG. 2, the six windings of the six-phase motor may be respectively first windings and second windings. The first windings are respectively a winding 311, a winding 312, and a winding 313 of the six-phase motor, and the second windings are respectively a winding 314, a winding 315, and a winding 316 of the six-phase motor. The six phase legs may include legs 331 to 336, where the leg 331, the leg 332, and the leg 333 are respectively connected to the winding 311, the winding 312, and the winding 313 in the first windings in one-to-one correspondence. The leg 334, the leg 335, and the leg 336 are respectively connected to the winding 314, the winding 315, and the winding 316 in the second windings in one-to-one correspondence.

Specifically, a joint of an upper leg 3311 and a lower leg 3312 of the leg 331 is connected to one end of the winding 311, a joint of an upper leg 3321 and a lower leg 3322 of the leg 332 is connected to one end of the winding 312, a joint of an upper leg 3331 and a lower leg 3332 of the leg 333 is connected to one end of the winding 313, a joint of an upper leg 3341 and a lower leg 3342 of the leg 334 is connected to one end of the winding 314, a joint of an upper leg 3351 and a lower leg 3352 of the leg 335 is connected to one end of the winding 315, and a joint of an upper leg 3361 and a lower leg 3362 of the leg 336 is connected to one end of the winding 316.

The power supply module 210, the upper legs 3311 to 3331, the windings 311 to 313, the windings 314 to 316, and the lower legs 3342 to 3362 together form a discharge loop, as shown in FIG. 2. Similarly, the power supply module 210, the lower legs 3312 to 3332, the windings 311 to 313, the windings 314 to 316, and the upper legs 3341 to 3361 together form a charge loop, as shown in FIG. 3. The charge loop and the discharge loop are periodically and alternately turned on under the control of the control module 240.

In the embodiments shown in FIG. 2 and FIG. 3, a spatial phase difference among three windings, namely, the windings 311 to 313 into which the current flows is controlled to be 120° and a spatial phase difference among three windings, namely, the windings 314 to 316 from which the current flows is controlled to be 120°, so that vibration noise of the motor can be effectively suppressed when a loop of the six-phase motor is used to heat the traction battery. In addition, since the traction battery heating system provided in this embodiment of this application does not make the motor operate, the problem that a rotor of the motor is overheated can be resolved, thereby prolonging a time for self-heating of the battery.

It should be noted that the windings 311 to 313 may serve as input windings and the windings 314 to 316 may serve as output windings. Alternatively, the windings 311 to 313 may serve as output windings and the windings 314 to 316 may serve as input windings. The discharge loop shown in FIG. 2 and the charge loop shown in FIG. 3 can be implemented provided that the upper legs of the three phase legs connected to the windings 311 to 313 and the lower legs of the three phase legs connected to the windings 314 to 316 all have their switching units kept on or off, and that the lower legs of the three phase legs connected to the windings 311 to 313 and the upper legs connected to the windings 314 to 316 all have their switching units kept on or off.

Optionally, the traction battery heating circuit shown in FIG. 2 and FIG. 3 further includes a capacitor C connected in parallel to the power supply module 210. The capacitor C mainly stabilizes voltage and filters out noise waves.

Following the idea of the foregoing traction battery heating circuit, an embodiment of this application further provides a traction battery heating control method, which may be applied to the foregoing traction battery heating circuit. The method includes: sending an enabling signal to control upper legs of at least three phase legs in the leg circuit and lower legs of the same number of phase legs in remaining legs to be turned on, so that a power supply module 210, an inverter module 220, and a driving module 230 of a battery heating circuit form a charge loop and a discharge loop that are alternately switched.

The enabling signal is generally a digital signal of high level or low level for controlling the on/off of leg switches in the leg circuit. For example, in a case that a high-level digital signal controls an upper leg and a lower leg of a leg circuit to be turned on and off respectively, when a phase leg receives a high-level enabling signal sent by the control module 240, an upper leg of the phase leg is turned on, and a lower leg of the phase leg is turned off.

In some embodiments, the control module 240 may send a heating signal to different legs of the inverter module 220 at a preset frequency to control the inverter module 220 to alternately switch the charge loop and the discharge loop.

The preset frequency is a preset number of times of sending the heating signals to different legs of the inverter module 220 per unit time. The preset frequency may be used to define a time interval between two transmissions of the heating signal. To be specific, the control module 240 resends the heating signals to the inverter module 220 after a preset time interval since the control module 240 has sent the heating signals to the inverter module 220. In addition, two adjacent heating signals are sent to different legs to control the inverter module 220 to alternately switch the charge loop and the discharge loop.

In a case that the time interval is too long, the battery may be discharged for a long time, consuming power of the battery and hence further reducing discharge efficiency of the battery, or the motor does work for a long time, which may cause a rotor of the motor to rotate or a stator of the motor to be overheated. In a case that the time interval is too long, a small current passes through the battery for a short time, which causes that heat generated is not sufficient to effectively heat the battery group. Therefore, in this embodiment, the control module 240 is made to send the heating signals to different legs in the inverter module 220 at the preset frequency. The preset frequency may be specifically selected based on an actual situation, so as to avoid that the time interval for sending the heating signals is too short or too long.

Specifically, for sending the heating signals to the inverter module 220 at the preset frequency, the control module 240 may alternately send a first heating signal and a second heating signal to the inverter module 220 at the preset frequency. The first heating signal turns on the upper legs of the at least three phase legs in the leg circuit and the lower legs of the same number of phase legs in the remaining legs, so that the power supply module 210, the inverter module 220, and the driving module 230 of the battery heating circuit form the charge loop. The second heating signal turns on the lower legs of the at least three phase legs and upper legs of the same number of phase legs in the remaining legs, so that the power supply module 210, the inverter module 220, and the driving module 230 of the battery heating circuit form the discharge loop.

Like the enabling signal, the first heating signal and the second heating signal may both be a digital signal of high level or low level for controlling the on/off of leg switches in the leg circuit. For example, in a case that a high-level digital signal controls an upper leg and a lower leg of a leg circuit to be turned on and off respectively, when a phase leg receives a high-level enabling signal sent by the control module 240, an upper leg of the phase leg is turned on, and a lower leg of the phase leg is turned off.

The control module 240 sends the first heating signal and the second heating signal to the inverter module 220 at the preset frequency to control corresponding legs in the leg circuit to be turned on and off, respectively, so that the power supply module 210, the inverter module 220, and the driving module 230 of the battery heating circuit to alternately form the charge loop and the discharge loop at a corresponding frequency. In this way, not only the traction battery can be effectively heated, but also energy loss and noise caused by long-time charge or discharge can be avoided.

When the motor of the driving module is a six-phase symmetric motor, specifically, the first heating signal turns on upper legs of three phase legs in the six-phase leg circuit and lower legs of the other three phase legs, so that the power supply module 210, the inverter module 220, and the driving module 230 of the battery heating circuit form the charge loop. The second heating signal turns on lower legs of the three phase legs in the six-phase leg circuit and upper legs of the other three phase legs, so that the power supply module 210, the inverter module 220, and the driving module 230 of the battery heating circuit form the discharge loop. In addition, in the charge loop or the discharge loop, a spatial phase difference among three windings respectively connected to the three phase upper legs turned on is 120°, and a spatial phase difference among three windings respectively connected to the three lower legs turned on is 120°.

In the charge loop or the discharge loop, in a case that the spatial phase difference among the three windings connected to the three phase upper (lower) legs turned on is 120°, a spatial phase difference of currents flowing into (out of) the three phase windings is 120°, so that a stator magnetic field formed by the spatially symmetric three phase windings is close to zero (about 0-0.5 T), thereby effectively suppressing vibration noise caused by interaction of the stator magnetic field with a rotor magnetic field when a traction battery is heated by the traction battery heating circuit. In addition, a resultant magnetic field of currents flowing into a plurality of windings of the same motor is controlled to be 0-0.5T, so that the motor does not operate, and the problem of a rotor of the motor being overheated can be solved, thereby prolonging a time for self-heating of the battery.

In some embodiments, the sending heating signals to the inverter module 220 at a preset frequency may include: determining whether a state of charge of the battery group is greater than or equal to a preset threshold; and if yes, sending the heating signals to the inverter module 220 at the preset frequency.

State of charge (State Of Charge, SOC) refers to a rate of a remaining capacity of a battery at a specific discharge rate to a rated capacity under the same condition. SOC is one of the most important parameters of a battery management system (Battery Management System) and also the basis of a charge and discharge control policy and battery equalization of a whole vehicle. However, due to the structure complexity of lithium batteries, state of charge of lithium batteries can not be directly measured, but can only be estimated through calculation by using a related characteristic curve or calculation formula according to some external characteristics of the batteries, for example, internal resistance, temperature, current, and other related parameters of the batteries.

The embodiments of this application may be applied to a scenario of heating a low-temperature traction battery. For example, the embodiments may be applied to a specific scenario of heating a traction battery to increase the temperature of the traction battery to a temperature at which the battery group can be normally used. Specifically, in this embodiment of this application, when the SOC of the traction battery is greater than the preset threshold, a current flowing through the loop may be modulated into an alternating current. Heat is generated as a result of internal resistance that the alternating current experiences when passing through the traction battery, thereby heating the traction battery and improving heating efficiency. When the SOC of the battery is less than or equal to the preset threshold, that is, when the battery has insufficient power, a direct current is used to generate heat at windings to heat the traction battery, thereby reducing power consumption and improving flexibility of the traction battery heating system.

Optionally, the inverter module 220 may be controlled at the beginning so that a current flowing through the motor loop is a direct current and the SOC of the traction battery is periodically determined. Once it is determined that the SOC of the traction battery is greater than the preset threshold, the inverter module 220 is controlled so that the current flowing through the motor loop is an alternating current. The alternating current is used to generate heat through the internal resistance of the traction battery, thereby heating the traction battery and hence improving the heating efficiency.

Specifically, the current flowing through the windings of the motor may be modulated into direct current or alternating current by using a space vector pulse width modulation (Space Vector Pulse Width Modulation, SVPWM) algorithm.

It should be noted that when direct current is applied to the windings of the motor, a radial electromagnetic force of the motor is reduced, and eddy-current loss of the rotor of the motor is reduced. Consequently, less heat is generated by the rotor. Therefore, when direct current is applied to the windings of the motor, less heat is generated by the rotor of the motor and electromagnetic vibration noise is reduced.

In some embodiments, the sending heating signals to the inverter module 220 at a preset frequency may include the following processing: obtaining an operating state of the motor; and sending the heating signals to the inverter module 220 at the preset frequency in a case that the operating state of the motor is a non-driving state.

The operating state of the motor being determined can avoid that the traction battery is heated when the motor is in the driving state, so that performance of a power apparatus such as a vehicle is not affected.

Further, the heating signals may be sent to the inverter module 220 when the motor is in a non-driving state and the traction battery heating system is not faulty.

It should be noted that in this embodiment of this application, the traction battery heating system being faulty means that any one of the power supply module 210, the driving module 230, the control module 240, the inverter module 220, the heat conduction loop, and the like fails. The heat conduction loop failing includes but is not limited to damage to an interconnecting valve or insufficient media in the heat conduction loop.

Optionally, gear information and motor speed information may be obtained, and whether the motor is in the driving state or the non-driving state is determined based on the foregoing information. Specifically, when it is determined that a current gear is P and a vehicle speed is 0, it indicates that the motor is in the non-driving state. When it is determined that a current gear is not P or a vehicle speed is not 0, it indicates that the motor is in the driving state. Determination is performed based on the gear information and the motor speed information. When any one of the foregoing information is not satisfied, no heating signal is sent to the motor, so as to avoid that the traction battery is heated when the vehicle is driving normally, thus performance of the vehicle is not affected.

In some embodiments, the sending heating signals to the inverter module 220 at a preset frequency may include: receiving request data sent by a battery management system; and sending the heating signals to the inverter module 220 at the preset frequency in a case that the request data indicates that the traction battery meets a heating condition.

The heating request sent by the BMS is received so that the control module can control the traction battery heating system to heat the traction battery in time, so as to avoid affecting the use of a power apparatus such as a vehicle.

In some embodiments, the sending heating signals to the inverter module 220 at a preset frequency may include: receiving a control signal sent by a vehicle control unit; and sending the heating signals to the inverter module 220 at the preset frequency in a case that the control signal indicates heating the traction battery.

In this embodiment of this application, the control module 240 may include a vehicle control unit (Vehicle control unit, VCU) and/or a motor control unit (Motor control unit, MCU).

Optionally, when the vehicle control unit receives the heating request sent by the BMS, the vehicle control unit may send the control signal to the motor control unit. The control signal is used for instructing heating the traction battery. In other words, the control signal is used for instructing the motor control unit to send the heating signals to the inverter module 220. For example, after receiving the control signal sent by the vehicle control unit, the motor control unit may send a first heating signal to the inverter module 220. The first heating signal is used for controlling the inverter module 220 such that the power supply module 210, the inverter module 220, the three first windings, and the three second windings form a discharge loop (or charge loop). After a preset time interval, the motor control unit sends a second heating signal to the inverter module 220. The second heating signal is used for controlling the inverter module 220 such that the power supply module 210, the inverter module 220, the three first windings, and the three second windings form a charge loop (or discharge loop). The charge loop and the discharge loop have opposite current directions, and the current flows from the three first windings in sequence, and then flows out of the three second windings.

In some embodiments, the traction battery heating control method further includes the following processing: determining whether a temperature of the battery group meets a stop heating condition, where the stop heating condition includes that the battery group reaches a preset temperature or the traction battery experiences abnormal temperature rise; and if yes, sending a stop heating signal to the inverter module 220, where the stop heating signal enables the inverter module 220 to open the charge loop or the discharge loop.

The preset temperature may be set to a temperature at which the battery group can operate normally, and may be slightly higher than a minimum temperature at which the battery group can operate normally, so as to prolong a time interval for reheating the battery group. Abnormal temperature rise may be the temperature rising too fast or too slow.

The stop heating signal is set, so that heating can be stopped in time after the battery group experiences abnormal temperature rise or reaches the normal working temperature, so as to avoid waste of resources and facilitate timely use for users.

Figure 4:
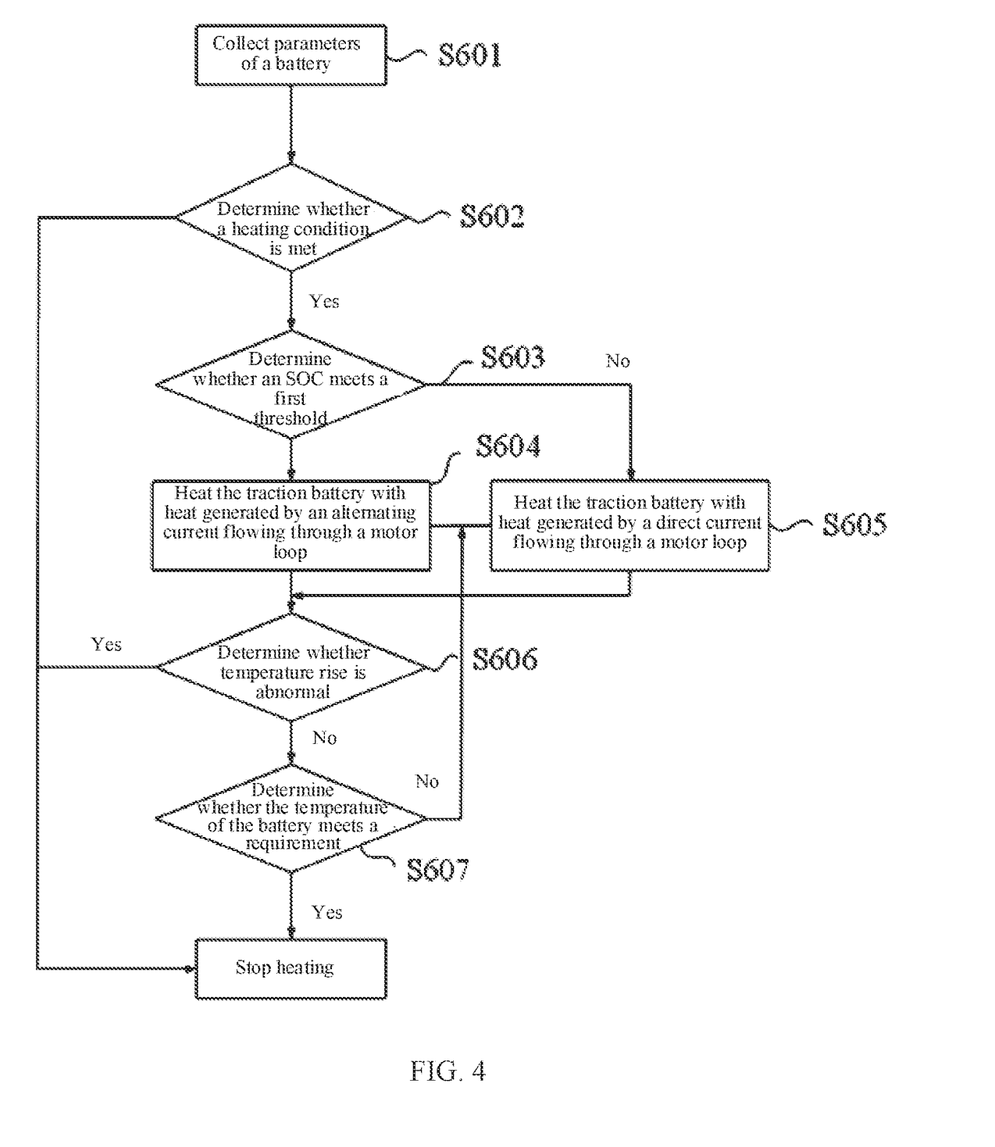
FIG. 4 is a flowchart of a control method for a traction battery heating scenario according to an embodiment of this application.

The traction battery heating control methods according to the embodiments of this application are described in detail with reference to the traction battery heating circuits shown in FIG. 2 and FIG. 3, respectively. FIG. 4 is a schematic flowchart of the traction battery heating control method. As shown in FIG. 4, the control method includes the following steps.

S601. A BMS collects parameters such as a temperature, an SOC, a voltage signal, and a current signal of a battery.

S602. The BMS determines, based on the battery parameters, whether a heating condition is satisfied, and if yes, sends a corresponding heating request to a VCU based on the SOC, for example, sending to the VCU an electric power required for heating the battery to a preset temperature.

S603. The BMS or VCU determines whether the SOC of the battery is greater than a preset threshold.

S604. In a case that the SOC is greater than the preset threshold, heat the traction battery with heat generated by an alternating current flowing through a motor loop.

S605. In a case that the SOC is less than or equal to the preset threshold, heat the traction battery with heat generated by a direct current flowing through a motor loop.

After 604, the VCU reads a current operating state of a motor.

For example, in a case that the motor is in the driving state (namely, an operating state), the VCU sends a driving signal to a motor control unit. In this case, the motor control unit sends a periodic driving signal to the inverter module 220, to control upper legs and lower legs of legs 331 to 336 to be turned on and off according to the periodic driving signal sent by the motor control unit, thereby implementing inversion control of current of the battery. In a case that the motor is in the non-driving state, the VCU sends a control signal to the motor control unit. In this case, the motor control unit sends a first heating signal and a second heating signal to the inverter module 220, and alternately controls the upper legs of the legs 331 to 333 and the lower legs of the legs 334 to 336, and the lower legs of the legs 331 to 333 and the upper legs of the legs 334 to 336 all to be turned on and off.

Specifically, when the upper legs 3311, 3321, and 3331 of the legs 331 to 333 and the lower legs 3342, 3352, and 3362 of the legs 334 to 336 are turned on, and the lower legs 3312, 3322, and 3332 of the legs 331 to 333 and the upper legs 3341, 3351, and 3361 of the legs 334 to 336 are turned off, the battery 350 is discharged, and the discharge loop is as follows:
350(+)(3311/3321/3331)→(311/312/313)→(314/315/316)→(3342/3352/3362)→350(−).

The state of the current is shown in FIG. 2. When the lower legs 3312, 3322, and 3332 of the legs 331 to 333 and the upper legs 3341, 3351, and 3361 of the legs 334 to 336 are turned on, and the upper legs 3311, 3321, and 3331 of the legs 331 to 333 and the lower legs 3342, 3352, and 3362 of the legs 334 to 336 are turned off, the battery 350 is charged, and the charge loop is as follows:
350(−)→(3312/3322/3332)→(311/312/313)→(314/315/316)→(3341/3351/3361)→350(+). The state of the current is shown in FIG. 3.

S606. The BMS determines whether the temperature of the battery group is abnormal, and if yes, the BMS sends abnormal temperature rise information to the VCU, and the VCU forwards the abnormal temperature rise information to the motor control unit to stop heating.

S607. In a case that the BMS determines that the temperature rise is not abnormal in S606, the BMS determines whether the temperature of the battery group meets a requirement, and if yes, the VCU forwards heating stop information to the motor control unit to stop heating, and if not, S604/S605 and S606 are repeated.

In the traction battery heating control method provided in this embodiment of this application, the control module 240 controls the upper legs of the at least three phase legs in the leg circuit and the lower legs of the same number of phase legs in the remaining legs to be turned on, so that the power supply module 210, the inverter module 220, and the driving module 230 form the charge loop and the discharge loop that are alternately switched, so as to charge and discharge the battery group. In this way, the charge and discharge loops for cycling charge and discharge can be formed, and the battery group can be continuously heated until the battery group reaches a normal operating temperature, so that the traction battery can be used normally in a low temperature environment, avoiding that the charge and discharge capability of the traction battery is limited, and significantly improving experience of customers in driving vehicles in winter.

Following the idea of the foregoing traction battery heating circuit, an embodiment of this application further provides a traction battery heating system. The system includes a heating control unit and the foregoing traction battery heating circuit, where the heating control unit is configured to send instructions to the traction battery heating circuit to control the traction battery heating circuit to form a charge loop and a discharge loop that are alternately switched.

Specifically, the heating control unit may be the foregoing vehicle control unit, and the control module 240 of the traction battery heating circuit may be a motor control unit. It should be noted that the heating control unit may alternatively be a control unit provided separately and specially for sending instructions to the traction battery heating circuit to control the traction battery heating circuit to form the charge loop and the discharge loop that are alternately switched. This is not specifically limited in this embodiment.

The traction battery heating system provided in this embodiment of this application controls the traction battery heating circuit via the control module to form the charge loop and the discharge loop that are alternately switched, so as to charge and discharge the battery group. In this way, the charge and discharge loops for cycling charge and discharge can be formed, and the battery group can be continuously heated until the battery group reaches a normal operating temperature, so that the traction battery can be used normally in a low temperature environment, avoiding that the charge and discharge capability of the traction battery is limited, and significantly improving experience of customers in driving vehicles in winter.

Following the idea of the foregoing traction battery heating circuit, an embodiment of this application further provides an electric device, including the foregoing traction battery heating system.

The traction battery heating system of the electric device provided in this embodiment of this application may control the traction battery heating circuit via the control module to form the charge loop and the discharge loop that are alternately switched, so as to charge and discharge the battery group. In this way, the charge and discharge loops for cycling charge and discharge can be formed, and the battery group can be continuously heated until the battery group reaches a normal operating temperature, so that the traction battery can be used normally in a low temperature environment, avoiding that the charge and discharge capability of the traction battery is limited, and significantly improving experience of customers in driving vehicles in winter.

Alternatively, the electric device may be a power vehicle.

Figure 5:
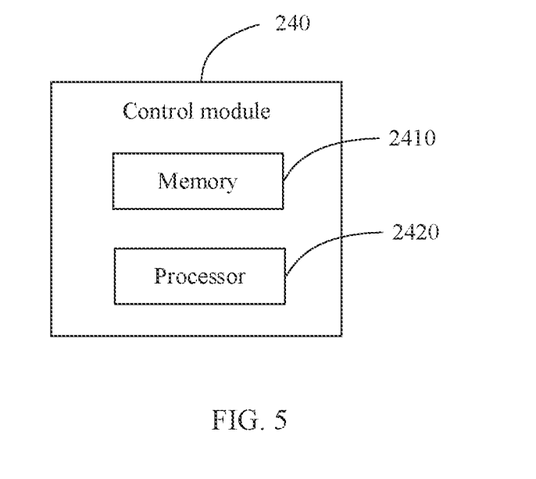
FIG. 5 is a schematic block diagram of a heating control unit according to an embodiment of this application.

FIG. 5 is a schematic block diagram of a control module 240 of a traction battery heating circuit according to an embodiment of this application. As shown in FIG. 5, the control module 240 includes a processor 2410. Optionally, the control module 240 further includes a memory 2420. The memory 2420 is configured to store instructions. The processor 2410 is configured to read the instructions and perform the methods of the foregoing various embodiments of this application according to the instructions.

Persons of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

The invention claimed is:

1. A traction battery heating circuit, comprising:
a power supply module, comprising at least one battery group;
an inverter module, connected to the power supply module and comprising an M-phase leg circuit, wherein the leg circuit is connected in parallel to the battery group, and M is an even multiple of three;
a driving module, comprising a motor having M windings, wherein the M windings are respectively connected to M phase legs of the leg circuit in one-to-one correspondence; and
a control module, connected to the leg circuit, wherein the control module is configured to control upper legs of at least three phase legs in the leg circuit and lower legs of the same number of phase legs in remaining phase legs to be turned on and control the lower legs of the at least three phase legs and upper legs of the remaining phase legs to be turned off, so that the power supply module, the inverter module, and the driving module form a charge loop, the control module is configured to, at a preset frequency, alternately switch to turn on the lower legs of the at least three phase legs and the upper legs of the remaining phase legs and turn off the upper legs of the at least three phase legs and the lower legs of the remaining phase legs, so that the power supply module, the inverter module, and the driving module form a discharge loop, whereby the charge loop and the discharge loop are alternately switched.

2. The traction battery heating circuit according to claim 1, wherein the motor comprises a six-phase symmetric motor.

3. The traction battery heating circuit according to claim 1, wherein in the charge loop or the discharge loop, a spatial phase difference among three windings respectively connected to the three phase upper legs turned on is 120°, and a spatial phase difference among three windings respectively connected to the lower legs turned on is 120°.

4. A traction battery heating system, comprising a heating control unit and the traction battery heating circuit according to claim 1, wherein the heating control unit is configured to send instructions to the traction battery heating circuit to control the traction battery heating circuit to form charge loop and discharge loop that are alternately switched.

5. An electric device, comprising the traction battery heating system according to claim 4.

6. The traction battery heating circuit according to claim 1, wherein the inverter module is implemented by a leg circuit of insulated gate bipolar transistors (IGBTs).

7. The traction battery heating circuit according to claim 1, wherein a capacitor is connected in parallel with the power supply module and is configured to stabilize voltage and filter noise waves during alternation of the charge loop and the discharge loop.

8. The traction battery heating circuit according to claim 1, wherein when the motor is a six-phase symmetric motor, the three windings associated with the turned on upper legs are mutually separated by 120°, and the three windings associated with the turned on lower legs are mutually separated by 120°, and a resultant magnetic field of currents flowing into the M windings is controlled to be 0-0.5 T, such that the motor does not operate.

9. The traction battery heating circuit according to claim 1, wherein the preset frequency is set such that two adjacent enabling signals are sent to different legs to alternately switch the charge loop and the discharge loop.

10. The traction battery heating circuit according to claim 1, wherein in the discharge loop, a direct current flows from a positive terminal of the battery group to a negative terminal of the battery group; and in the charge loop, a direct current from the negative terminal of the battery group to the positive terminal of the battery group.

11. A traction battery heating control method, applied by a traction battery heating circuit, wherein the traction battery heating circuit comprises a power supply module, an inverter module, a driving module, and a control module,
wherein the power supply comprises at least one battery group,
the inverter module is connected to the power supply module and comprises an M-phase leg circuit, wherein the M-phased leg circuit is connected in parallel to the battery group, and M is an even multiple of three,
the driving module comprises a motor having M windings, wherein the M windings are respectively connected to M phase legs of the leg circuit in one-to-one correspondence,
the control module is connected to the leg circuit,
wherein the traction battery heating control method comprises:
sending, by the control module, an enabling signal to the inverter module, the enabling signal comprising a first enabling signal and a second enabling signal at a preset frequency, wherein
the first enabling signal controls upper legs of at least three phase legs in the M-phase leg circuit and lower legs of the same number of phase legs in remaining legs of the M-phase leg circuit to be turned on and controls the lower legs of the at least three phase legs and upper legs of the remaining phase legs to be turned off, so that the power supply module, the inverter module, and the driving module of the battery heating circuit form a charge loop,
the second enabling signal controls the lower legs of the at least three phase legs and the upper legs of the remaining phase legs to be turned on and controls the upper legs of the at least three phase legs and the lower legs of the remaining phase legs to be turned off to form a discharge loop, whereby the charge loop and the discharge loop are alternately switched.

12. The traction battery heating control method according to claim 11, wherein the enabling signal is a heating signal, the first enabling signal is a first heating signal, and the second enabling signal is a second heating signal.

13. The traction battery heating control method according to claim 12, wherein a motor of the driving module comprises a six-phase symmetric motor;
the first heating signal turns on upper legs of three phase legs in a six-phase leg circuit and lower legs of the other three phase legs, so that the power supply module, the inverter module, and the driving module of the battery heating circuit form the charge loop;
the second heating signal turns on lower legs of the three phase legs in the six-phase leg circuit and upper legs of the other three phase legs, so that the power supply module, the inverter module, and the driving module of the battery heating circuit form the discharge loop; and
in the charge loop or the discharge loop, a spatial phase difference among three windings respectively connected to the three phase upper legs turned on is 120°, and a spatial phase difference among three windings respectively connected to the three lower legs turned on is 120°.

14. The traction battery heating control method according to claim 12, further comprising:
determining whether a state of charge of the battery group is greater than or equal to a preset threshold;
wherein, the heating signals are sent to the inverter module at the preset frequency upon a determination that the state of charge of the battery group is greater than or equal to a preset threshold.

15. The traction battery heating control method according to claim 12, further comprising:
obtaining an operating state of the motor;
wherein the heating signals are sent to the inverter module at the preset frequency if the operating state of the motor is a non-driving state.

16. The traction battery heating control method according to claim 12, further comprising:
receiving, by the control module, a control signal sent by a vehicle control unit;
wherein the heating signals are sent to the inverter module at the preset frequency if the control signal indicates heating the traction battery.

17. The traction battery heating control method according to claim 12, further comprising:
receiving, in the control module, request data sent by a battery management system;
wherein the heating signals are sent to the inverter module at the preset frequency if the request data indicates that the traction battery meets a heating condition.

18. The traction battery heating control method according to claim 11, wherein the method further comprises:
determining whether a temperature of the battery group meets a stop heating condition, wherein the stop heating condition comprises that the battery group reaches a preset temperature or the traction battery experiences abnormal temperature rise; and
sending a stop heating signal to the inverter module, wherein the stop heating signal enables the inverter module to open the charge loop or the discharge loop, if the temperature of the battery group meets the stop heating condition.

* * * * *